(12) United States Patent
Jaakkola

(10) Patent No.: US 9,082,058 B2
(45) Date of Patent: Jul. 14, 2015

(54) ANTENNA CONSTRUCTION, FOR EXAMPLE FOR AN RFID TRANSPONDER SYSTEM

(75) Inventor: Kaarle Jaakkola, Espoo (FI)

(73) Assignee: TEKNOLOGIAN TUTKIMUSKESKUS VTT, Espoo (FI)

( * ) Notice: Subject to any disclaimer, the term of this patent is extended or adjusted under 35 U.S.C. 154(b) by 289 days.

(21) Appl. No.: 13/496,583

(22) PCT Filed: Sep. 14, 2010

(86) PCT No.: PCT/FI2010/050706
§ 371 (c)(1),
(2), (4) Date: May 3, 2012

(87) PCT Pub. No.: WO2011/033172
PCT Pub. Date: Mar. 24, 2011

(65) Prior Publication Data
US 2012/0206313 A1      Aug. 16, 2012

(30) Foreign Application Priority Data

Sep. 18, 2009   (FI) .................................... 20095965

(51) Int. Cl.
*H01Q 9/28* (2006.01)
*H01Q 7/00* (2006.01)
*G06K 19/077* (2006.01)
*H01Q 1/22* (2006.01)

(52) U.S. Cl.
CPC .... *G06K 19/07749* (2013.01); *G06K 19/07756* (2013.01); *G06K 19/07771* (2013.01); *G06K 19/07786* (2013.01); *H01Q 1/2225* (2013.01); *H01Q 7/00* (2013.01); *Y10T 29/49016* (2015.01); *Y10T 29/49018* (2015.01)

(58) Field of Classification Search
CPC ........ H01Q 1/2225; H01Q 7/00; H01Q 7/009
See application file for complete search history.

(56) References Cited

U.S. PATENT DOCUMENTS

| | | | |
|---|---|---|---|
| 6,456,243 B1 * | 9/2002 | Poilasne et al. | 343/700 MS |
| 6,675,461 B1 * | 1/2004 | Rowson et al. | 29/600 |
| 8,384,599 B2 * | 2/2013 | Carr | 343/700 MS |
| 2003/0201942 A1 * | 10/2003 | Poilasne et al. | 343/702 |
| 2006/0208900 A1 | 9/2006 | Tavassoli Hozouri | |
| 2009/0085750 A1 | 4/2009 | Waldner et al. | |
| 2009/0096696 A1 | 4/2009 | Joyce, Jr. et al. | |
| 2010/0033394 A1 * | 2/2010 | Krier et al. | 343/793 |
| 2014/0374490 A1 * | 12/2014 | Jaakkola | 235/492 |

FOREIGN PATENT DOCUMENTS

| | | |
|---|---|---|
| CN | 101032050 A | 9/2007 |
| CN | 101040289 A | 9/2007 |
| CN | 101048786 A | 10/2007 |
| EP | 1 818 861 A2 | 8/2007 |
| JP | 2003-249814 A | 9/2003 |
| JP | 2009-260757 A | 11/2009 |
| WO | WO 2009/102708 A1 | 8/2009 |

* cited by examiner

*Primary Examiner* — Trinh Dinh
(74) *Attorney, Agent, or Firm* — Birch, Stewart, Kolasch & Birch, LLP

(57) ABSTRACT

The invention relates to an antenna construction for an RFID chip for long ranges, which comprises a substrate, an antenna of conducting material supported by the substrate, and coupling means for coupling the antenna to a circuit. In accordance with the invention the antenna is a magnetic dipole, and the coupling means are formed by extensions of the antenna conductor.

16 Claims, 4 Drawing Sheets

ANTENNA CONSTRUCTION, FOR EXAMPLE FOR AN RFID TRANSPONDER SYSTEM

The present invention relates to an antenna construction according to the preamble of Claim 1.

The invention also relates to the manufacturing method of the antenna construction.

The antenna is used, for example, with remote-identifier circuits.

So far the market of UHF RFID transponders has been divided into cheap labels and more expensive rigid tags that are applicable also on metal platform. The typical rigid transponders are large and expensive and thus applicable only on big and expensive items. Some small rigid tags have entered the market but with significantly lower performance than the big ones.

On today's market, there are already some small metal-mountable RFID transponders available. In this context, "small" can be defined as the footprint area of the transponder being less than 10 $cm^2$ and the maximum dimension being less than quarter of the wavelength (86 mm @ 867 MHz). Generally, the problem with these small tags is that making a transponder small in size always leads to some compromises. Practically, these compromises reduce the read range which is the key parameter for evaluating the reliability and performance of a passive RFID system.

First of all, the radiation efficiency of the transponder is reduced by the size limitation. This is basically a physical fact that cannot be fully overcome, only minimized by e.g. optimal materials. But with very small antennas, the poor impedance match between the microchip and the antenna typically causes even greater part of the loss in read range than the reduced radiation efficiency. The conjugate impedance coupling between the antenna and the microchip that is needed for optimal operation typically cannot be achieved with a very small antenna and the current methods. The most typical solution with very small tags is to provide only reactive coupling, which is a partial solution. In the case of more complex radio systems with antennas, such as mobile devices and base stations, this impedance match needed is often achieved using discrete components (capacitors and inductors) or microstrip elements. For small RFID tags, microstrip elements are a way too large. Discrete components would be small enough, but they are out of question for cost and processability reasons.

The small metal-mount transponders existing on today's market have somewhat compromised performance. Additionally to the low radiation efficiency of the small antenna, their read range is remarkably decreased by the poor impedance match between the microchip and the antenna.

There are several different types of RFID transponder: passive, semipassive (or battery assisted passive) and active, as well as those to which a connection can be made inductively, capacitively, or with the aid of a radio-frequency radiation field. Passive transponders generate the electrical energy they need from the RF field aimed at them. In active and semipassive transponders, there is a separate battery or other power supply. Inductively connected RFID and remote sensor systems typically operate at frequencies of 100-125 kHz or 13.56 MHz.

The most preferred embodiments of the present invention relate to passive RFID transponders readable using a radio-frequency radiation field, but the antenna type is advantageous in all applications in which the antenna is required to have a long reading distance combined with smallsize, and to be able to be attached to some base, for example, the surface of goods or packages. Such a surface is usually flat. The frequencies most advantageously suitable for the invention are 869 MHz and 2.45 Ghz.

An RFID transponder is a small device comprising an antenna and a microcircuit with a memory, which transmits the contents of its memory by backscattering, when it receives a transmit command from a reading device and the reading device illuminates it with a radio signal. In a passive RFID transponder there is no battery, instead it draws the operating power it requires from the radio signal transmitted to it. The transmission of power and information between the transponder and the reading device can take place with the aid of a magnetic field, an electrical field, or a radiating radio signal. In many transponder applications, it is important for the distance between the reader and the transponder to be long—even up to several meters.

The present invention is intended to eliminate at least some defects of the prior art to create an entirely new type of antenna and method for manufacturing the antenna.

The invention is about technical solutions that enable a high-performance, small and low-cost all-platform transponder especially for long range operation.

The invention is based on using magnetic dipole as an antenna (radiator) in a long range RFID transponder. In the advantageous solution of the invention, conjugate impedance match is formed from the radiator to the microchip by a capacitive impedance transformer by integrated part of the antenna. The resistive part of the feed impedance of a small magnetic dipole (loop) antenna is very low. Reactance of this type of an antenna is positive and very high compared to the resistance. The impedance of the microchip, on the other hand, is capacitive and the real part is higher than the one of the non-matched loop antenna. This makes it possible to achieve perfect conjugate impedance match between the magnetic dipole antenna and the microchip by using a capacitive impedance transformer. The new way of making the antenna provides this capacitive transformer and thus perfect impedance match as a part of the antenna without any external elements.

The invention is about an all-platform UHF RFID transponder (or tag) which is small in size but still provides a long read range. The invention also contains solutions to enable low-cost and high-repeatability manufacturing process of the transponder. The good performance and platform tolerance is based on utilizing magnetic dipole as the radiator and even more importantly, providing conjugate impedance match between the antenna and the microchip. This is typically difficult with very small transponders. The impedance match is achieved with a new way of implementing an impedance transformer. This is achieved with standard processes and inexpensive and common materials.

More specifically, the antenna construction according to the invention is characterized by what is stated in the characterizing portion of Claim 1.

The method according to the invention is, in turn, characterized by what is stated in the characterizing portion of Claim 10.

Considerable advantages are gained with the aid of the invention.

As long read range, small size, platform tolerance and low cost can be achieved by the present invention.

Lots of e.g. metal objects can be tagged with a transponder that is a lot smaller and cheaper than transponders so far with corresponding read range.

The antenna type is therefore immune to the surface to which it is attached. The antenna type according to the embodiments of the invention is also economical to manufacture. In addition, the sensor structure can also be easily and at low cost combined, for example with RFID electronics.

In the following, the invention is examined with the aid of examples of embodiments according to the accompanying figures.

Figure 1:
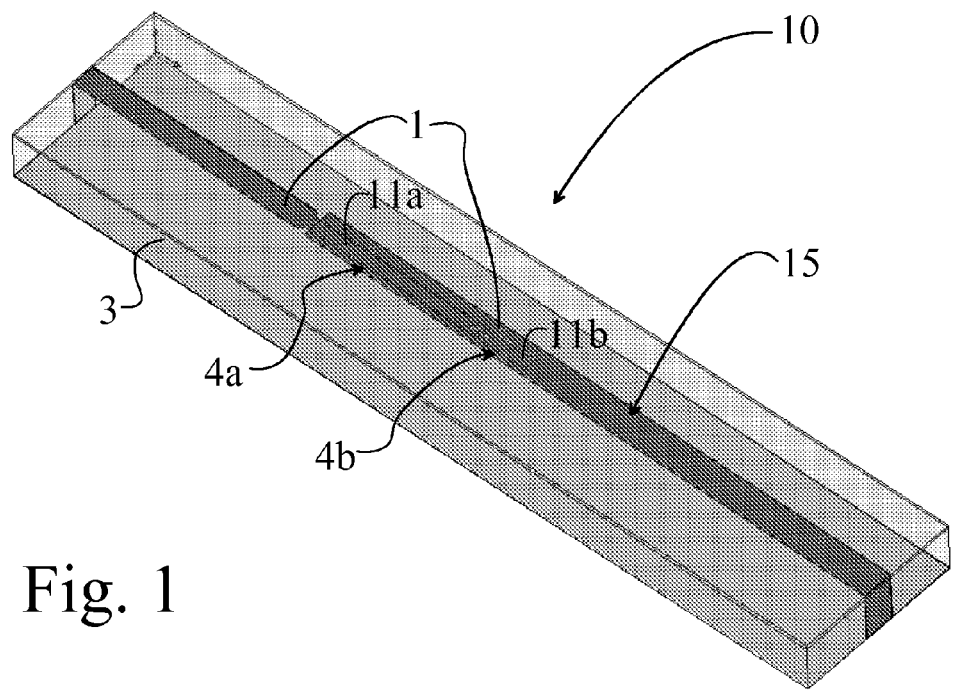
FIG. 1 shows a perspective view one antenna structure in accordance with the invention.

In the small transponder according to the invention, the basic idea is to make the impedance matching without costly discrete components. The capacitors needed for impedance matching are formed by metal and dielectric layers of the antenna structure, thus integrating them as a part of the transponder instead of using expensive additional elements. With this type of integrated capacitors, very high Q values can be achieved as their area can be large compared to surface mount components, and the contact resistances are negligible. The invention also comprises a new principle of combining the microchip, integrated capacitors and the antenna itself, which keeps the structure still simple and easy to process. The tag can be made e.g. by wrapping a flexible inlay around a piece of plastic. Also a printed circuit board technology can be used for fabrication. In this latter case only two vias through the whole board at the ends of the tag are needed. Any special materials such as materials with high permittivity (that are sometimes used for small transponders) are not needed. Instead, cheap plastics such as PE or PP are very good substrate materials for a transponder. The flexible inlays with metal pattern and microchip can be made using inexpensive standard roll-to-toll processes that exist because of their use for manufacturing label transponders. The freedom to use integrated discrete capacitances to adjust the impedance for the microchip allows us to use magnetic dipole as the radiator with still being able to obtain the right impedance for the microchip. Vertical magnetic loop, technically a magnetic dipole, is a very efficient radiator in small size. It is also very immune to near field disturbances unlike the electric dipole. Therefore the transponder can easily be made platform tolerant, allowing the use of the transponder also on metal surface, which is the most challenging mounting platform for an RFID transponder. The only big problem of a magnetic dipole, too low feed impedance for a microchip, can now be overcome by the impedance transformer formed by the integrated capacitors. The method of forming the capacitors for the impedance transformer makes it possible to easily vary the capacitance values and thus match various impedances. Consequently, the size of the antenna itself can be selected freely based on e.g. the needs of a particular application.

One general problem with very small transponders, especially in this case with high internal Q values, is the narrow bandwidth of the antenna. This sets challenging requirements for the tolerances of the fabrication process, as a small change in dimensioning can cause large reduce in the read range. The transponder according to the invention also includes a solution to this problem. As the typical fabrication error in this type of processes is the misalignment between metal layers, the capacitors are made asymmetrical so that their shearing area won't change although the layers would be misaligned in respect to each other.

Figure 2:
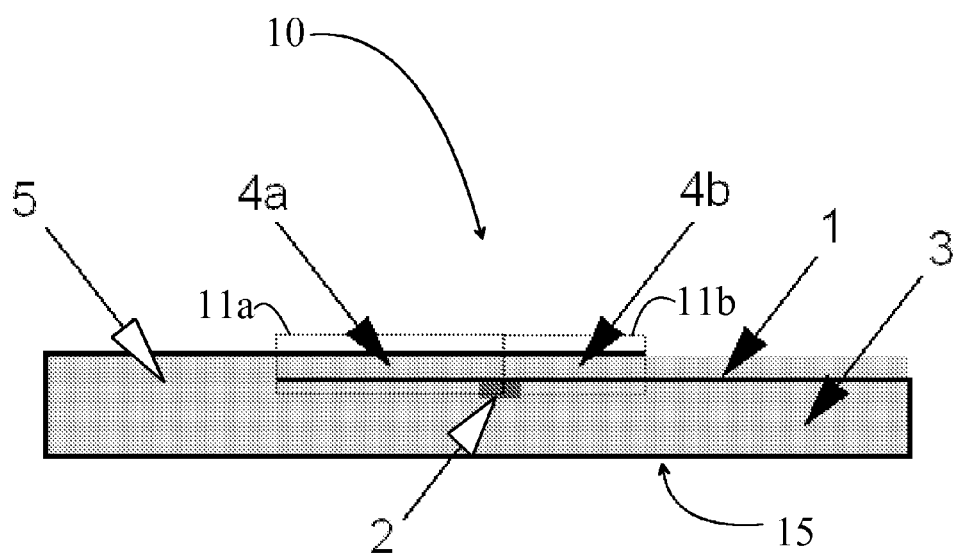
FIG. 2 shows a cross sectional side view of one antenna structure according to the invention.
Figure 3:
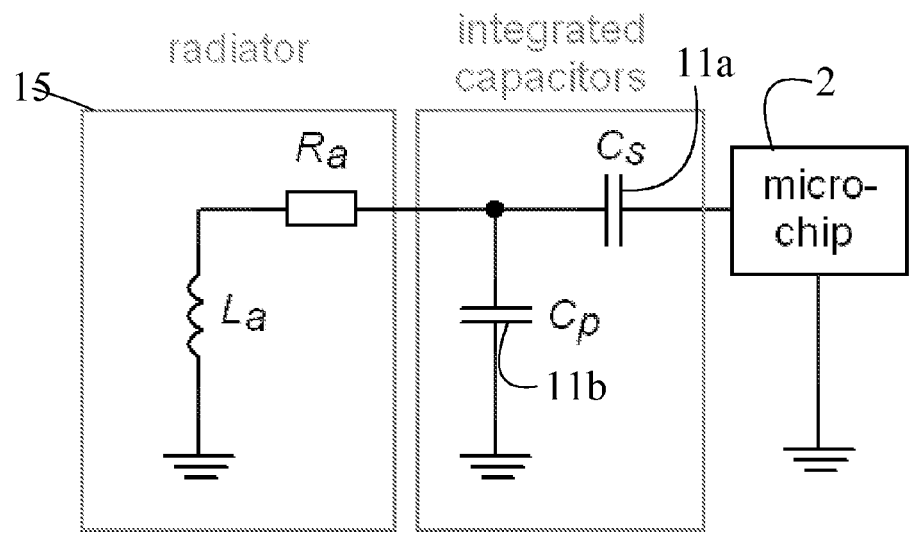
FIG. 3 shows schematically an equivalent circuit of the transponder in accordance with the invention.

The structure of the transponder is depicted in the figures below. In FIG. 1 there is a perspective view of the structure with transparent interlayer of an actual functional prototype of a transponder, fabricated by bending an antenna conductor, in this case a foil inlay 1 around a substrate 3 in a form of plastic brick. FIG. 2 shows the side view of the transponder fabricated by bending. The transponder 10 comprises an inlay 1 that contains the metal pattern on a thin plastic carrier foil 5 and the microchip 2. This thin and flexible inlay 1 is wrapped around a plastic brick 3 for forming the antenna structure 15 and the impedance forming capacitors 11a and 11b. The impedance transforming capacitors 11a and 11b are formed by the inlay 1 overlapping itself in areas points 4a and 4b. Referring to above, one idea of the invention is to make the upper and lower electrodes of each connection capacitor asymmetric such that one electrode, typically the embedded one is larger and the other, smaller one is manufactured on the area of the larger electrode. By this way the smaller electrode defines the capacitance value of the capacitor. By selecting the smaller electrode such its area is easy to manufacture precisely or tune afterwards precisely, a very good coupling between the microchip 2 and antenna 15 can be achieved. In other words the electrode pairs 11a and 11b of the capacitors are formed by electrodes of different areas. In the picture there is an optional thin plastic sheet 5 between the overlapping parts of the inlay. The material of the plastic carrier of the inlay as well as the dimensioning can be selected so that this additional part will not be needed. The equivalent circuit of the structure is shown in FIG. 3. Since the small magnetic loop radiator is inductive, it is represented by a series connection of the antenna inductance La and the antenna resistance Ra. The integrated capacitor Cp (parallel capacitance) equals 11b of FIG. 2 and Cs (series capacitance) equals 11a.

Figure 5:
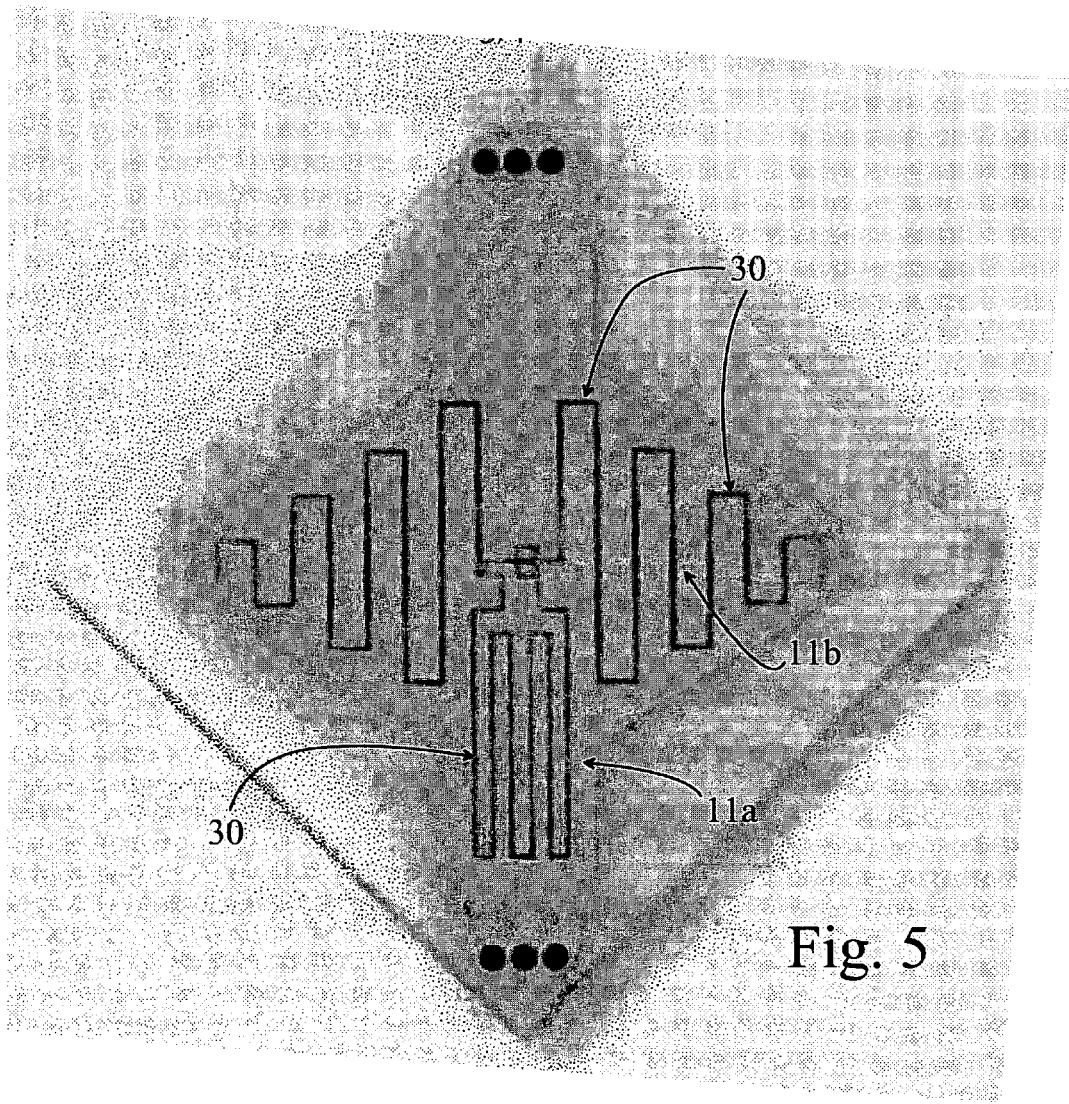
FIG. 5 shows as a top view another antenna structure in accordance with the invention.

Alternatively, in accordance with FIG. 5, the coupling electrodes 11a and 11b may be formed in the same plane in a form of parallel finger electrodes having a long, narrow curved electrode gap 30. The value of capacitors 11a and 11b can be adjusted by the length and the width of the gap 30.

Figure 4:
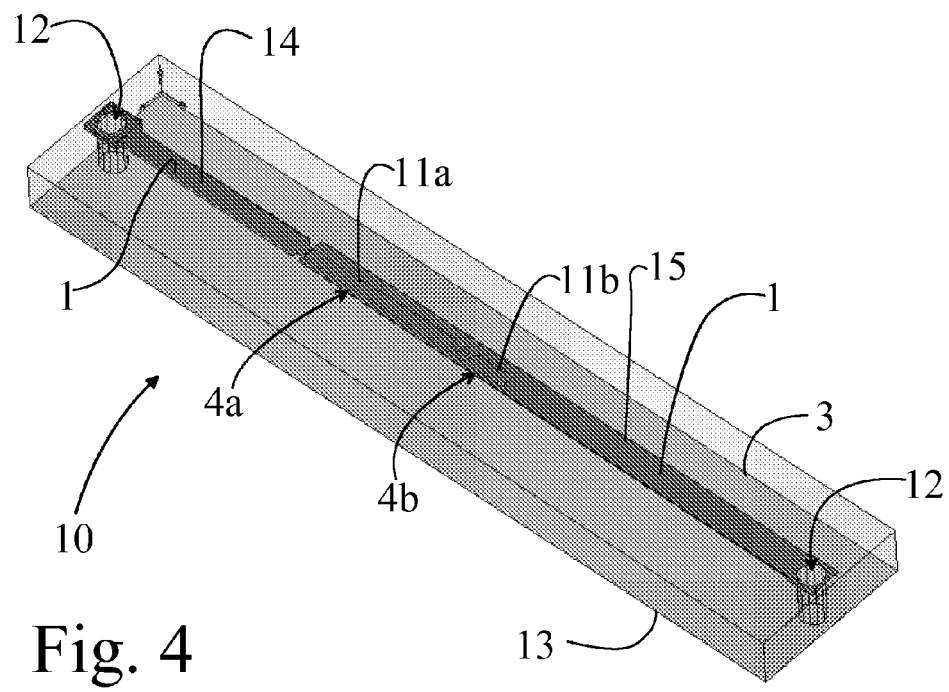
FIG. 4 shows a perspective view another antenna structure in accordance with the invention.

FIG. 4 represents the similar structure fabricated by printed circuit board (PCB) technology. Using this technology, the transponder contains an antenna conductor 1 of three metal layers for forming the antenna structure 15 and the impedance transforming capacitors 11a and 11b: ground layer 13, mid layer 14 and top layer 15. These layers are connected to each other by vias 12. This is also a cross sectional view of an actual prototype. The size of the both transponder prototypes (FIG. 1. and FIG. 4.) is 50 mm*10 mm*3 mm, but the technology enables also transponders that are smaller. The smallest prototype designed using this technology and inexpensive standard materials has been 9 mm*9 mm*3 mm in size.

The invention enables various sizes and form factors for a transponder. They can be fixed according to the customer's and application based need. Prototypes (size in mm) from 50*10*3 $mm^3$ down to 9*9*3 $mm^3$ have been designed.

Figure 6A:
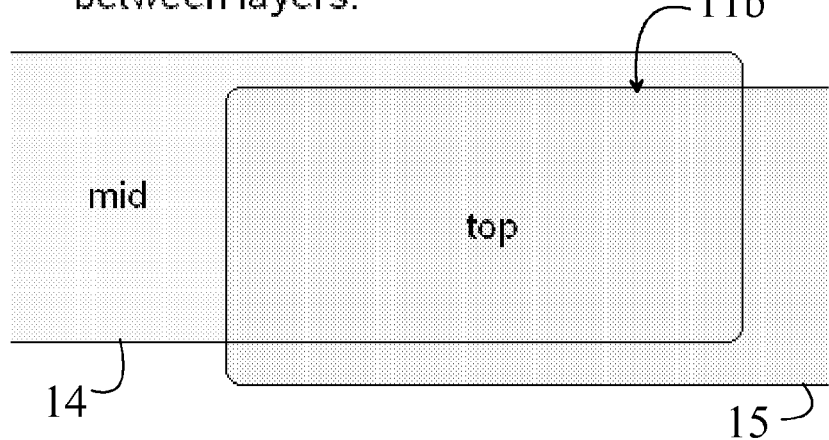
FIG. 6a shows as a top view in more detail one possible embodiment of FIG. 4.

In FIG. 6a is presented the problem solved by one preferred embodiment of the invention. In FIG. 6a the conducting top layer 15 is not aligned with the conducting mid layer 14 and therefore the designed value for capacitor 11b is not obtained but the capacitance of the capacitor 11b is smaller than designed.

Figure 6B:
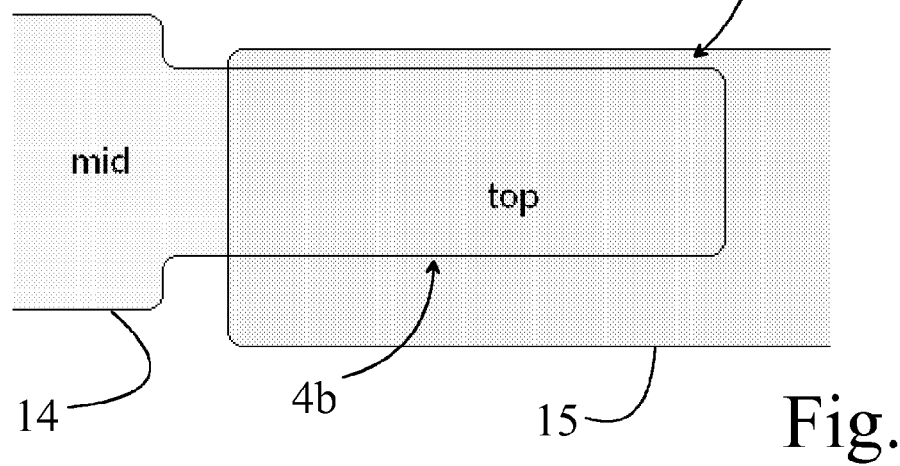
FIG. 6b shows as a top view one preferred embodiment of FIG. 4

In FIG. 6b this alignment problem is solved by forming the conducting mid layer 14 smaller and in the middle in the area of the capacitor 11b. In other words one of the two electrodes is made smaller but also in such position that the larger electrode totally overlaps in a normal manufacturing process. By this way a small misalignment of the top layer 15 does not affect to the capacitance value of capacitor 11*b*. Correspondingly the top layer 15 can be made smaller while the mid layer 14 is kept larger than the top layer in the area of the capacitor 11*b*.

All the technology needed for PCB process based fabrication is readily available, and the major fabrication related problems have been solved. The alternative fabrication method by bending has not been implemented with any commercial partner yet.

This invention is intended for long range RFID transponders meaning transponders capable for reading ranges over 1 meter.

In one concrete solution of the invention the dimensions of the structure are as follows for a 867 MHz transponder:
Loop area (cross section of the loop): 50 mm*3 mm
gap of capacitor 11*a*: 0.2 mm
gap of capacitor 11*b*: 0.2 mm
effective area of capacitor 11*a*: 5 mm$^2$
effective area of capacitor 11*b*: 6 mm$^2$
With a prototype of these parameters, read range of 4 m has been measured (using NXP Ucode G2XM microchip).

The invention claimed is:

1. An antenna construction for an RFID chip for long ranges, which comprises
    a substrate,
    a magnetic pole antenna of conducting material supported by the substrate, and
    a coupling means for coupling the antenna to a circuit, said coupling means being formed by overlapping extensions of the antenna by electrode pairs of different but completely overlapping areas, whereby a smaller electrode in each electrode pair defines a capacitance value for the pair,
wherein one electrode pair is connected between and in series with the antenna and an RFID chip, and another electrode pair is connected with the antenna in parallel.

2. An antenna construction according to claim 1, wherein the coupling means are formed by parallel extensions of the antenna.

3. An antenna construction according to claim 2, further comprising a microchip.

4. An antenna construction according to claim 1, further comprising a microchip.

5. An antenna construction according to claim 1, wherein the antenna and coupling means are formed by wrapping a conducting layer around the substrate.

6. An antenna construction according to claim 1, wherein the antenna and coupling means are formed by printed circuit board technology.

7. An antenna construction according to claim 6, wherein vias are used for connecting different conductive layers forming the antenna.

8. An antenna construction according to claim 1, wherein conjugate impedance match between the microchip and the antenna is implemented by using a capacitive impedance transformer integrated in the antenna.

9. Use of the antenna defined in claim 1 on a platform such that a magnetic field caused by the antenna is arranged essentially parallel with the platform in order to minimize an influence of the platform's material.

10. A method for forming an antenna construction for a RFID chip for long ranges, which method includes steps for
    forming a magnetic pole antenna of conducting material on a substrate, and
    forming a coupling means for coupling the antenna to a circuit by overlapping extensions of the antenna by electrode pairs of different but completely overlapping areas, whereby a smaller electrode in each electrode pair defines a capacitance value for the pair,
wherein one electrode pair is connected between and in series with the antenna and an RFID chip, and another electrode pair is connected with the antenna in parallel.

11. A method according to claim 10, wherein the coupling means are formed by parallel extensions of the antenna.

12. A method according to claim 10, wherein a microchip is connected to the coupling means.

13. A method according to claim 10, wherein the antenna and coupling means are formed by wrapping a conducting layer around a substrate.

14. A method according to claim 10, wherein the antenna and coupling means are formed by printed circuit board technology.

15. A method according to claim 14, wherein vias are used for connecting different conductive layers forming the antenna.

16. A method according to claim 10, further comprising implementing conjugate impedance match between the microchip and the antenna by using a capacitive impedance transformer integrated in the antenna.

* * * * *